No. 820,506. PATENTED MAY 15, 1906.
C. A. LAMBERT.
PIANO ACTION.
APPLICATION FILED MAR. 10, 1905.
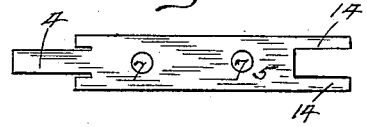
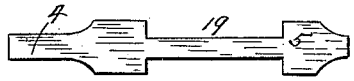
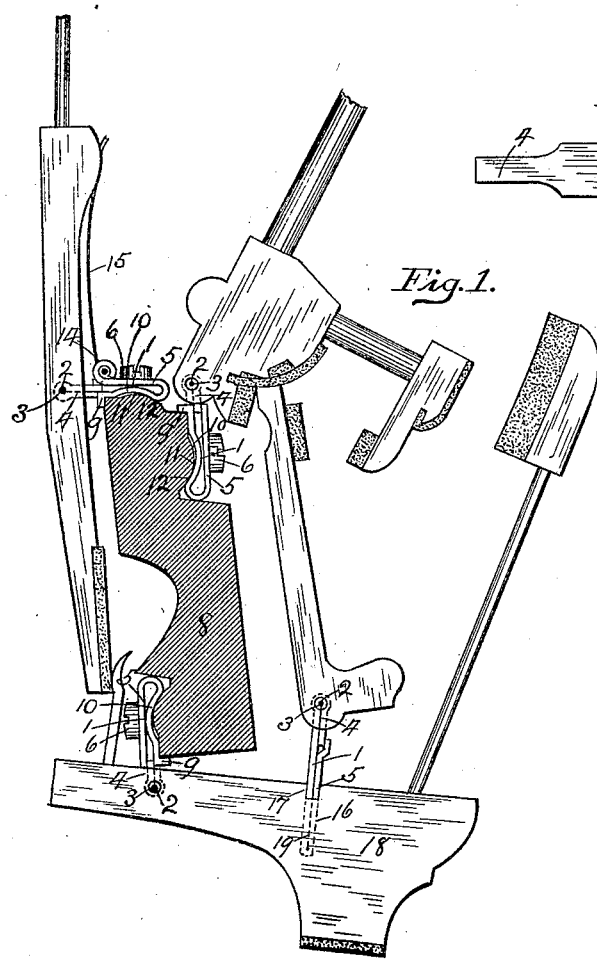
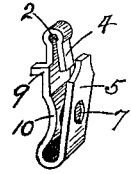
WITNESSES:
J. W. Macy.
H. K. Blinn.
INVENTOR.
Clayton A. Lambert.

UNITED STATES PATENT OFFICE.

CLAYTON A. LAMBERT, OF CINCINNATI, OHIO, ASSIGNOR TO THE BALDWIN COMPANY, OF CINCINNATI, OHIO.

PIANO-ACTION.

No. 820,506.          Specification of Letters Patent.          Patented May 15, 1906.

Application filed March 10, 1905. Serial No. 249,345.

*To all whom it may concern:*

Be it known that I, CLAYTON A. LAMBERT, a citizen of the United States, residing at Cincinnati, in the county of Hamilton and State of Ohio, have invented certain new and useful Improvements in Piano-Actions, of which the following is a full and clear description.

My invention relates to the flanges used in said actions, which form the pivotal bearings for the various moving parts and by which said moving parts are secured to the action-rails; and the object of my invention is to provide for this purpose a metal flange adapted to securely hold the center-pins and at the same time provide for the expansion and contraction of the wood rails, due to climatic influences, as will be hereinafter fully described.

Referring to the drawings, Figure 1 shows a section of a piano-action in which my improved flange is applied. Fig. 2 is a perspective view of my flange. Figs. 3, 4, and 5 show the blanks for my flanges as variously applied, stamped from the metal sheet.

Similar numerals of reference indicate corresponding parts.

The flange 1 is made from a blank of spring-brass or other metal formed with suitable dies, and comprises a pivotal bearing 2 for holding the center-pin 3, made by bending one end upon itself to form a bearing member 4, and a spring-clamp made by bending the opposite end upon itself to form a clamping member 5, the free end of the clamping member overlapping the free end of the bearing member and clamping the center-pin in its position by means of the screw 6, which passes through the openings 7 and secures the flange firmly to the action-rail 8.

An important object of the spring-clamp 5 is to hold the flange firmly in contact with the rail 8, even though the power of the screw 6 is relaxed, as this prevents any tendency of the flange to jar or rattle on the rail or screw, in the event that the rail 8 should shrink when exposed to conditions of extreme dryness.

One great objection to the ordinary wood flange is the difficulty of keeping them tight on the rail under the conditions described, and the same may be said of the metal flanges heretofore made, as such flanges have given trouble when the screws become slightly relaxed. This condition makes the process of tightening the screws frequently necessary and is a great annoyance to the musician.

It will be observed that the clamping member 5 is formed from the widest and heaviest portion of the blank, and the cylindrical bend where it is turned upon itself is comparatively large, which insures the greatest power to the spring and overcomes the objections referred to. That portion of the blank forming the bearing for the pin 3 is made much narrower than the remaining portion, and at its point of juncture with the main body of the flange a shoulder 9 is formed on each side of the bearing member, which engages the edge of the rail 8 and holds the flange in its true position thereon. This end is further attained by forming an inward curve 10 in that portion of the flange between the shoulders 9 and the bottom of the same and providing a corresponding raised portion 11 on the flange-rail, which forms a seat for the flange. The distance of the raised seat from the edge of the rail is such that the flange bears on the same at the point 12. This has a tendency, as the screw 6 is tightened, to force the flange downward upon its seat and causes the shoulders 9 to bear firmly upon the edge 12 of the rail 8.

My improved flange may be given slightly different forms in order to adapt it to different parts of a piano-action. In order to apply the flange to the damper-levers 13, loops 14 are formed at the ends of the overlapping clamping member 5 to accommodate the lever-spring 15, which is attached thereto.

In applying the flange to the fly or jack the curved portion 10 under the shoulders is omitted, and the clamping member 5 is bent close upon itself and the lower part 19 of the same reduced in width to adapt its being driven into an opeing 16 under the slot 17 in the wippen 18. The flange thus rests securely in the slot and performs the function of clamping the center-pin without the aid of a screw.

I am aware that prior to my invention metal flanges have been made by bending the metal upon itself to form a pivotal bearing, and that others have been made by bending the metal upon itself to form a spring-clamp for the center-pin. I therefore do not claim, broadly, these inventions; but What I do claim as my invention, and desire to secure by Letters Patent, is—

1. The combination with an action-rail, of a flange comprising a metal blank, one end of which is bent upon itself to form a pivotal bearing and the opposite end bent upon itself to form a spring-clamp, said flange having two opposed openings in the clamping member for a screw by which the flange is attached to the action-rail, substantially as described.

2. The combination with an action-rail, of a flange comprising a metal blank, one end of which is bent upon itself to form a pivotal bearing and the opposite end bent upon itself to form a spring-clamp; the end of the clamping member overlapping the end of the bearing member; said flange having two opposed openings in the spring member for a screw whereby the flange is attached to the action-rail, substantially as described.

3. The combination with an action-rail, of a flange comprising a metal blank with a narrow end portion bent upon itself to form a pivotal bearing, and a wide end portion bent upon itself to form a spring-clamp; said wide member overlapping and clamping the free end of said narrow member; said flange having two opposed openings in the wide member for a screw, whereby the flange is attached to the action-rail, substantially as described.

4. The combination with an action-rail, of a flange comprising a metal blank with a narrow end portion bent upon itself to form a pivotal bearing and a wide end portion bent upon itself to form a spring-clamp; said wide member overlapping and clamping the free end of said narrow member; said flange having a shoulder projecting from the wide member on each side of the narrow member; said shoulders being bent at right angles to the face of said flange and adapted to bear on the edge of said action-rail; and two opposed openings in said wide member for a screw whereby said flange is attached to said action-rail, substantially as described.

5. The combination with an action-rail of a flange comprising a metal blank, one end of which is bent upon itself to form a pivotal bearing and the opposite end bent upon itself to form a spring-clamp; the end of the clamping member overlapping the end of the bearing member; said flange having the middle portion thereof shaped with an inward curve, adapting it to rest on an outwardly-curved bearing on the action-rail; and two opposed openings in the clamping member for the screw whereby said flange is attached to said action-rail, substantially as described.

6. The combination with an action-rail 8 of a flange 1, comprising a metal blank, one end of which is bent upon itself to form a bearing member 4, having a pivotal bearing 2 adapted to hold the center-pin 3; the opposite end bent upon itself to form a clamping member 5, said clamping member overlapping and clamping said bearing member; said flange having a shoulder 9 formed on each side of the bearing member, adapted to rest in contact with the edge of the action-rail 8; and a middle portion 10 formed with an inward curve, a raised bearing 11 on said action-rail upon, which the curved portion of said flange rests; said flange having two opposed openings 7 in the clamping member 5 for the screw 6, whereby said flange is attached to said action-rail and held in contact with the bearing 11 and edge of said rail, substantially as described.

7. The combination with an action-rail of a flange comprising a metal blank, one end of which is bent upon itself to form a pivotal bearing and the opposite end bent upon itself to form a spring-clamp; the clamping member overlapping and clamping the bearing member; the end of the blank forming said clamping member having extensions from each side of the same bent to form loops; said clamping member having two openings for a screw whereby said flange is attached to the rail and the clamping member clamped upon the bearing member, substantially as described.

In testimony whereof I have signed my name in the presence of two subscribing witnesses.

CLAYTON A. LAMBERT.

Witnesses:
J. W. MACY,
H. K. BLINN.